(12) United States Patent
Verma et al.

(10) Patent No.: US 9,223,504 B2
(45) Date of Patent: Dec. 29, 2015

(54) METHOD AND SYSTEM FOR PLACEMENT OF LOGICAL DATA STORES TO MINIMIZE REQUEST RESPONSE TIME

(75) Inventors: Akshat Verma, New Delhi (IN); Ashok Anand, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 1276 days.

(21) Appl. No.: 12/056,591

(22) Filed: Mar. 27, 2008

(65) Prior Publication Data

US 2009/0019222 A1 Jan. 15, 2009

Related U.S. Application Data

(63) Continuation of application No. 11/622,008, filed on Jan. 11, 2007, now abandoned.

(51) Int. Cl.
   *G06F 12/02* (2006.01)
   *G06F 3/06* (2006.01)

(52) U.S. Cl.
   CPC .................................. *G06F 3/0611* (2013.01)

(58) Field of Classification Search
   USPC ........................................................ 711/114
   See application file for complete search history.

(56) References Cited

U.S. PATENT DOCUMENTS

2003/0115410 A1  6/2003  Shriver
2005/0289312 A1* 12/2005  Ghosal et al. ................. 711/167

OTHER PUBLICATIONS

L.W. Lee et al., "File assignment in parallel I/O systems with minimal variance of service time," IEEE Transactions on Computers, 49(2) (2000).*
Verma et al., U.S. Appl. No. 11/622,008, Office Action Communication, Jan. 8, 2010, 13 pages.
H. D. Karatza, "A Simulation Model of Backfilling and I/O Scheduling in a Partitionable Parallel System," Procs. of 32nd Conf. on Winter Simulation (2000).
S. Iyer et al., "Anticipatory scheduling: A disk scheduling framework to overcome deceptive idleness in synchronous I/O," Symposium on Operating Systems Principles (2001).
E. Shriver et al., "An Analytic Behavior Model for Disk Drives With Readahead Caches and Request Reordering," Measurement and Modeling of Computer Systems (1998).
G. Copeland et al., "Data placement in Buba," Procs. ACM SIGMOD (1988).

(Continued)

*Primary Examiner* — Kenneth Lo
(74) *Attorney, Agent, or Firm* — Gibb & Riley, LLC

(57) ABSTRACT

Logical data stores are placed on storages to minimize store request time. The stores are sorted. A store counter and a storage counter are each set to one. (A), (B), and (C) are repeated until the storage counter exceeds the number of storages within the array. (A) is setting a load for the storage specified by the storage counter to zero. (B) is performing (i), (ii), and (iii) while the load for the storage specified by the storage counter is less an average determined load over all the storages. (i) is allocating the store specified by the store counter to the storage specified by the storage counter; and, (ii) is incrementing the load for this storage by this storage's request arrival rate multiplied by an expected service time for the requests of this store. (iii) is incrementing the store counter by one. (C) is incrementing the storage counter by one.

7 Claims, 2 Drawing Sheets

(56) References Cited

OTHER PUBLICATIONS

J. Kurose et al., "A microeconomic approach to optimal resource allocation in distributed computer systems," IEEE Transactions on Computers, 38(5) (1989).

H. Lee et al., "Allocating data and workload among multiple servers in a local area network," Information Systems, 20(3) (1995).

L.W. Lee et al., "File assignment in parallel I/O systems with minimal variance of service time," IEEE Transactions on Computers, 49(2) (2000).

R. Garg et al., "On the optimal assignment of streams in server farms," IBM Research Report RI03004, May 2003.

Verma, et al., U.S. Appl. No. 11/622,008, Office Action Communication dated Jun. 22, 2009, 16 pages.

* cited by examiner

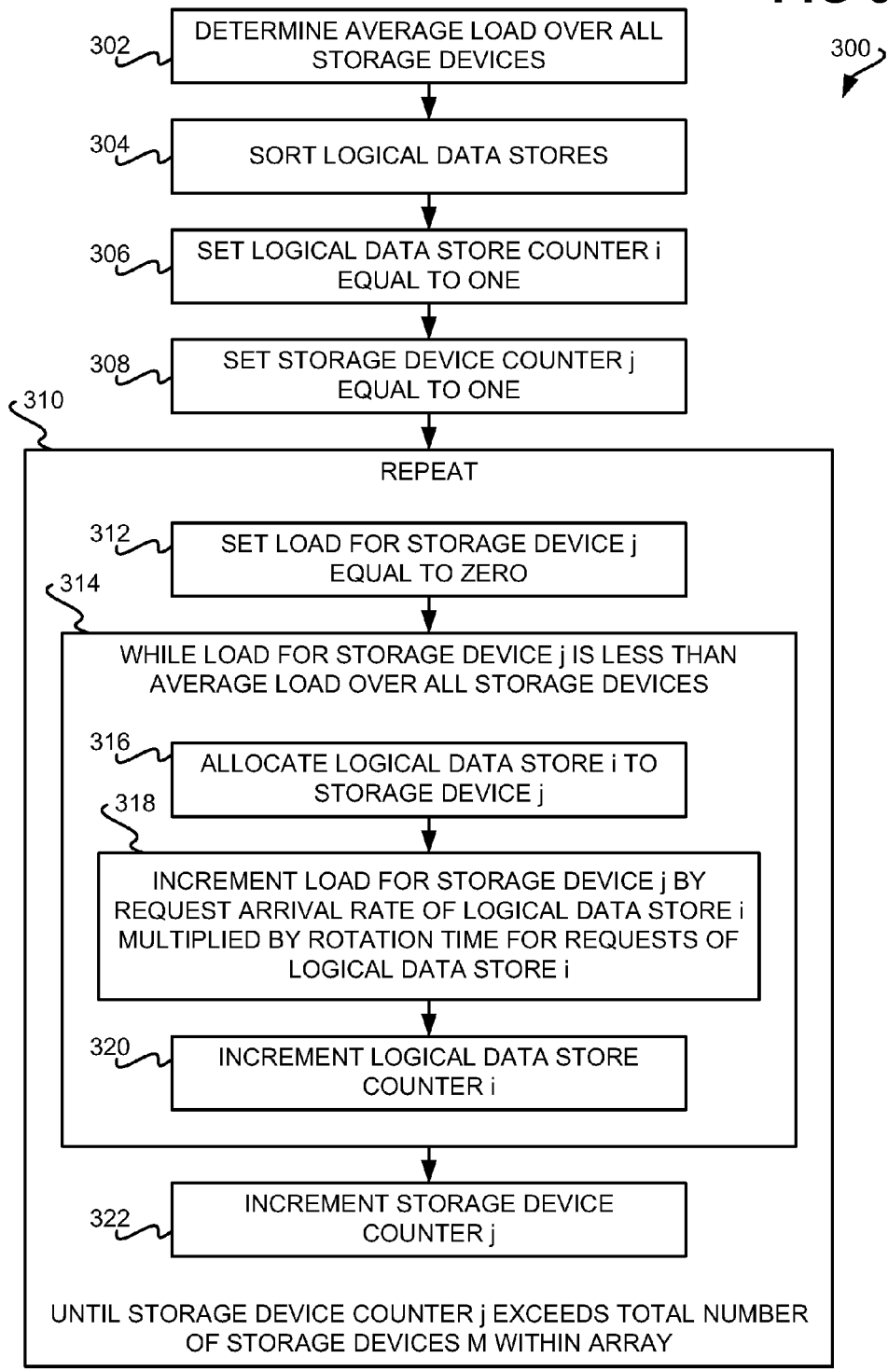

METHOD AND SYSTEM FOR PLACEMENT OF LOGICAL DATA STORES TO MINIMIZE REQUEST RESPONSE TIME

CROSS-REFERENCE TO RELATED APPLICATIONS

This application is a Continuation of U.S. application Ser. No. 11/622,008 filed Jan. 11, 2007, the complete disclosure of which, in its entirety, is herein incorporated by reference.

BACKGROUND

1. Field of the Invention

This invention relates generally to placing (i.e., allocating) logical data stores on an array of storage devices, and more particularly to placement such that store request time is minimized.

2. Background of the Invention

Parallel input/output (I/O) systems have been employed due to their ability to provide fast and reliable access, while supporting high transfer rates for dedicated supercomputing applications as well as diverse enterprise applications. Disk arrays are typically arranged to partition data across multiple hard disk drives within a storage pool, and provide concurrent access to multiple applications at the same time. A single application having large data requirements may further partition its data into stores and place them across multiple disks, such that the resulting parallelism alleviates the I/O bottleneck to a certain degree.

However, in modern web-services scenario where performance guarantees are in place, throughput is no longer the only performance requirement for applications. Many applications require that the average response time of their requests is maintained within certain thresholds, such that the average response time does not exceed a predetermined maximum time. Since storage latencies continue to dominate request response times, reducing the response time of a request effectively means minimizing storage latency. The high variance within service times due to the heterogeneous applications service from a disk array, combined with the non-work conserving nature of disk drives, implies that the response time of the requests of a logical data store is influenced primarily by the characteristics of other logical data stores placed on the same disk.

A logical data store can be a database table, files owned by a particular user, or data used by an application, among other types of logical data stores. A number of logical data stores may be placed over an array of parallel hard disk drives, which can be referred to as disks, or more generally as storage devices. A sequence of disk requests generated by an application or user can be denoted as a stream, and the logical data group accessed by the stream can be synonymously considered a logical data store as well.

Where there are a number of logical data stores to be placed on an array of storage devices, they are desirably placed on the storage devices such that the average response time for all store requests is minimized, and that their work load is balanced across all the storage devices. This issue also finds applications in web services, where user streams—i.e., logical data stores—are allocated to different web servers, and each server may manage its own storage. Current strategies for placing logical data stores on storage devices, however, do not minimize response.

SUMMARY OF THE INVENTION

This invention relates to placing logical data stores on an array of storage devices such that store request time is minimized. A method of one embodiment of this invention determines the average load over all the storage devices within the array. The logical data stores are sorted by some metric of the stores, and both a logical data store counter and a storage device counter are set equal to one. The following steps, parts, acts, or actions are repeated until the storage device counter exceeds the number of the storage devices within the array. First, a load for the storage device specified by the storage device counter is set equal to zero. Second, while the load for the storage device specified by the storage device counter is less the average load over all the storage devices within the array, the following steps, parts, acts, or actions are performed:

allocating the logical data store specified by the logical data store counter to the storage device specified by the storage device counter;

incrementing the load for the storage device specified by the storage device counter as a product of a request arrival rate of the logical data store specified by the logical data store counter and an average service time for the requests of the logical data store specified by the logical data store counter; and, incrementing the logical data store counter by one.

Third, the storage device counter is incremented by one. The result of the method is that the logical data stores are stored on the storage devices to which the logical data stores have been allocated, for user access of the logical data stores.

A data-processing system of an embodiment of the invention includes an array of storage devices over which a plurality of logical data stores is placed. The system further includes a mechanism coupled to the array of storage devices to determine on which storage device of the array of storage devices each logical data store is to be placed such that request times of the logical data stores are minimized. In a further embodiment, the system instead includes means for allocating each data store to one of the storage devices of the array of storage devices, such that request times of the logical data stores are minimized.

An advantage of the foregoing is that average response time for logical data store requests is significantly minimized by placing the logical data stores on the storage devices of an array. Enterprises and other organizations using embodiments of the invention are therefore better able to efficiently ensure performance guarantees in which average response time has to be under certain thresholds relating to the maximum length of time this average response time can be. Further advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of a method for placing logical data stores on an array of storage devices, such that store request time is minimized, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

System and Overview

Figure 1:
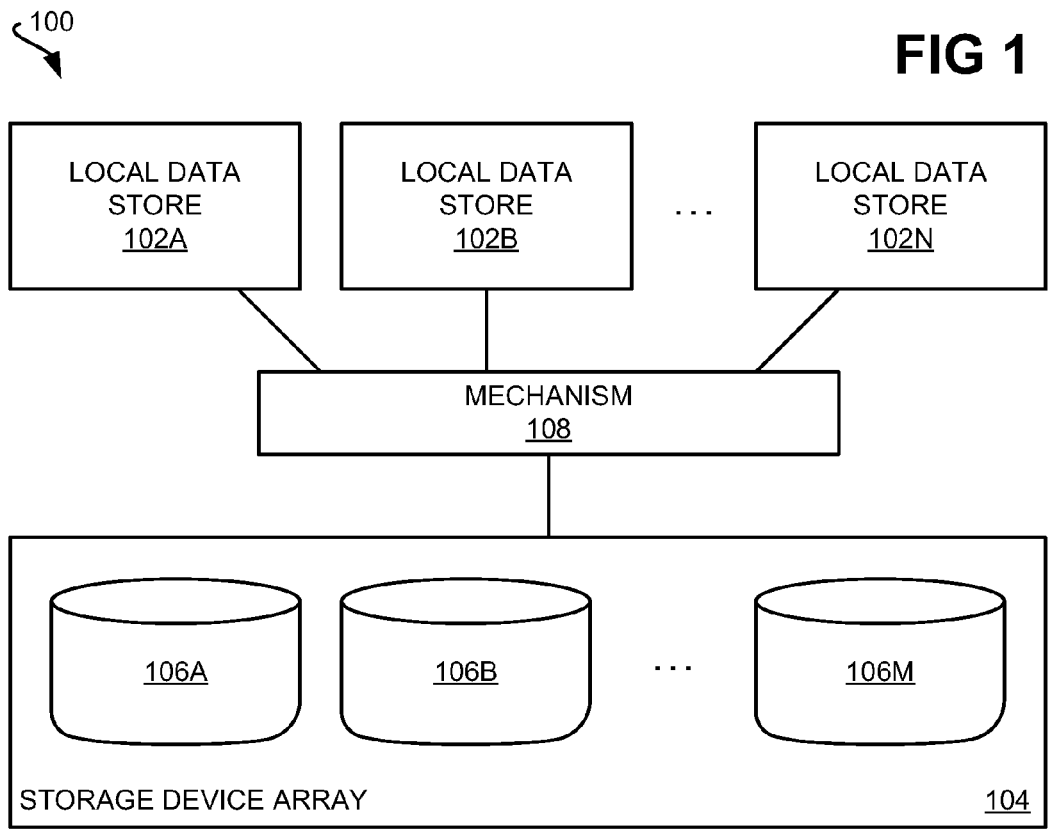
FIG. 1 is a diagram of a system for placing logical data stores on an array of storage devices, according to an embodiment of the invention.

FIG. 1 shows a data-processing system 100, according to an embodiment of the invention. The system 100 includes N logical data stores 102A, 102B, . . . , 102N, collectively referred to as the logical data stores 102. The system 100 further includes an array 104 of M storage devices 106A, 106B, . . . , 106M, collectively referred to as the storage devices 106. The number N of logical data stores 102 may be equal to, greater than, or less than the number M of storage devices 106. The system 100 also includes a mechanism 108, the functionality of which will be described later in the detailed description, and which may be implemented in software, hardware, or a combination of software and hardware.

The logical data stores 102 each is a logically aggregated set of data. For instance, within a database scenario, a logical data store is a table or a set of associated tables. For example, in a shared filesystem, all files belonging to a given user may constitute a store. In an information technology (IT) production scenario, all source files or all email files may constitute a logical data store. Access to each of the logical data stores 102 is represented as a number of streams, where each stream can be considered as an individual access from an application or a user. All such streams on an aggregated basis may therefore be considered synonymous with a logical data store. That is, as used herein, the notions of logical data stores and logical data streams are combined, such that either a logical data store or a (logical data) stream may be used to denote a set of logically grouped requests.

The storage devices 106 of the storage device array 104 may be hard disk drives in one embodiment. The storage devices 106 may each be an individual, single hard disk drive, or may each be a (sub-)array within the storage device array 104 itself. For instance, each of the storage devices 106 may be considered a RAID array in one embodiment of the invention.

The mechanism 108 locates, or maps, the logical data stores 102 over the storage devices 106 of the storage device array 104 such that request time as to the logical data stores 102, on average, is minimized. More specifically, given N logical data streams or stores $G_i$, and a set of M data storage devices $D_j$ in which to place the data stores, response time minimization locates an allocation of data stores to storage devices (denoted by a set of mappings $x_{i,j}$, where $x_{i,j}=1$ if store $G_i$ is placed on storage device $D_j$) such that the response time average over the requests on all the storage devices is minimized, subject to an additional constraint that the load is balanced evenly across all the storage devices.

More formally, the foregoing can be expressed as follows:

$$\min \frac{1}{\lambda_{tot}} \sum_{j=1}^{M} \lambda_j E(\delta_j) \quad (1)$$

$$\text{s.t. } \forall \text{ streams } G_i \sum_{j=1}^{M} x_{i,j} = 1, x_{i,j} \in [0,1] \quad (2)$$

$$\forall \text{storage devices } D_j, D_k \lambda_j E(S_j) = \lambda_k E(S_k) \text{(Balanced load condition)} \quad (3)$$

$$\forall \text{ storage devices } D_j \lambda_{D_j} = \sum_{i=1}^{N} x_{i,j} \lambda_i \quad (4)$$

$$\lambda_{tot} = \sum_{i=1}^{N} \lambda_i \quad (5)$$

$E(\delta_j)$ denotes the response time for storage device $D_j$ for a given allocation. The request (arrival) rate, the expected service time, and the second moment of the service time, respectively for a disk $D_k$ or a logical data store $G_i$ are denoted by $\lambda_k$, $E(S_k)$, and $E(S_k^2)$. The request arrival rate specifies the rate at which requests to the logical data store or storage device arrive at the logical data store or storage device. The expected service time specifies the expected length of time needed to serve a request. It is noted that in cases of ambiguity, $\lambda D_k$, $E(S_{D_k})$, and $E(S_{D_k}^2)$ are used for storage device parameters to distinguish such storage device parameters from stream or logical data store parameters.

The logical data stores 102 may each be represented as a set of requests with associated statistical parameters estimated a priori. Each data store may be identified by $G_i(\lambda_i, E(S_i), E(S_i^2), V_i)$, where $\lambda_i$ is the arrival rate of the requests, $E(S_i)$ is the expected service time of each request, and $E(S_i^2)$ is the expected second moment of the service time of each request, and $V_i$ is the size of the data store.

Request arrivals can be modeled by a Markov Modulated Poisson Process (MMPP), as known within the art. An MMPP is essentially modeled as a Poisson process with multiple states, where a given state determines the mean Poisson parameter $\lambda$. Where the storage devices 106 are hard disk drives, a two-state MMPP may be employed, where one state represents the on period and the other state represents the off period of the store placed on a given storage device.

A storage device server may be considered as including a pending queue where incoming requests are queued and a storage device, such as one of the storage devices 106, on which data is read or written. Data on a hard disk drive in particular is placed on concentric circular tracks that rotate at constant speed. When a request in the queue is selected to be served, the disk head is moved to the appropriate track, where it waits until the appropriate sector is positioned under the disk head, and then transfers (reads or writes) the data under consideration from and/or to the desired hard disk location. Hence, the access time for a hard disk drive includes seek time (the time to travel to the right track), rotational latency (time to access the correct sector), and transfer time (of the data). In modern hard disk drives, the seek and rotational latency dominate the transfer times.

The mechanism 108 in one embodiment is the component that performs a methodology for placing the logical data stores 102 on the storage devices 106 such that store request time is minimized. That is, the mechanism 108 determines on which of the storage devices 106 each of the logical data stores 102 can reside. Thus, clients access the logical data stores 102, which are placed, or stored, on the storage devices 106 as determined by the mechanism 108 in a way that store request time by these clients is minimized. When a client accesses a logical data store 102, the mechanism 108 can be considered to map such a request to the corresponding storage device 106 on which the logical data store 102 has been placed. A detailed presentment of one such methodology is described in the next section of the detailed description.

The mechanism 108 in one embodiment resides in, or is situated within, one or more of a number of different components commonly found within computing systems. For instance, the mechanism 108 may be implemented within a logical volume manager (LVM), which more generally is a logical space-to-physical space mapping mechanism that maps the logical data stores 102 to the storage devices 106. The mechanism 108 may be implemented within the file system of the storage devices 106. The mechanism 108 may be implemented within a database that directly employs raw partitions of the storage devices 106 without using a filesystem. The mechanism 108 may further be implemented within a controller for the array 104 of the storage devices 106.

Figure 2:
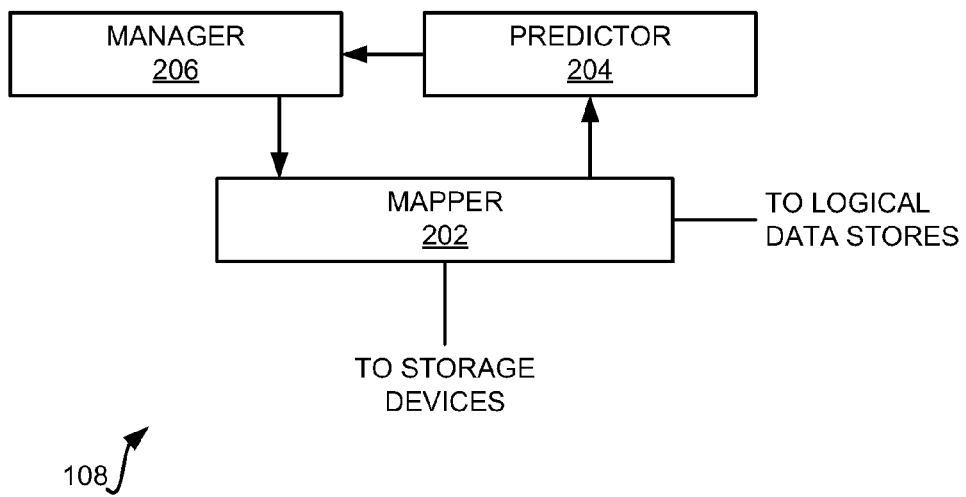
FIG. 2 is a diagram of a portion of the system of FIG. 1 in more detail, according to an embodiment of the invention.

FIG. 2 shows one implementation of the mechanism 108, according to an embodiment of the invention. Particularly, the mechanism 108 includes a mapper 202, a predictor 204, and a manager 206. The mapper 202 stores the mappings of the logical data stores 102 to the storage devices 106. The mapper 202 interacts directly with client accesses to the logical data stores 102, and with the storage devices 106 themselves.

The predictor 204 receives and/or monitors information regarding the logical data stores 102 and the storage devices 106 through the mapper 202. In particular, the predictor 204 estimates various stream parameters by probing the data path of the logical data stores 102 to the storage devices 106. These stream parameters may include the request arrival rate, expected service time, and the second moment of the service time, as have been described previously. The predictor 204 can in one embodiment employ time-series analysis-based prediction, as known within the art, to estimate the request arrival rate. Other parameters, such as the expected service time and the second moment of this expected service time, may be estimated by employing a history-based sliding window model with the weight of a measurement falling exponentially with the age of the measurement, as can be appreciated by those of ordinary skill within the art.

The manager 206 receives the stream, or logical data store, parameters from the predictor 204, and determines the placement of the logical data stores 102 on the storage devices 106 on that basis. Once this determination has been made, the manager 206 notifies the mapper 202, which stores the logical data store-to-storage device mappings. That is, the mapper 202 actually places the logical data stores 102 on the storage devices 106, as instructed by the manager 206.

Method and Conclusion

FIG. 3 shows a method 300 for placing logical data stores on storage devices such that store request time can be minimized, according to an embodiment of the invention. The method 300 may be performed in one embodiment by the mechanism 108. For instance, the mechanism 108 may determine which of the storage devices 106 to place each of the logical data stores 102.

It is noted first that the method 300 can be considered as leveraging the notion that the average waiting time for a request on a storage device can be divided into the time the disk was seeking, the time the disk was rotating, and the time that the disk was transferring data, which have been described above. Mathematically, $$E(\delta_j) = E(\delta_{j,s}) + E(\delta_{j,r}) + E(\delta_{j,s}) \quad (6)$$

In equation (6), $E(\delta_j)$ is the average waiting time for storage device $D_j$. $E(\delta_{j,s})$ is the average waiting time due to seeks. $E(\delta_{j,r})$ is the average waiting time due to rotation. $E(\delta_{j,t})$ is the average waiting time due to data transfer.

Minimizing the average seek waiting time is referred to herein as solving the seek time issue. Minimizing the average waiting due to rotation is referred to herein as solving the rotational delay issue. Likewise, minimizing the average waiting due to transfer is referred to herein as solving the transfer time issue. Thus, the method 300 minimizes store request time by minimizing the average waiting time $E(\delta_j)$, which in turn can be considered by minimizing one or more of the average waiting time due to seeks $E(\delta_{j,s})$, the average waiting time due to rotational latency $E(\delta_{j,r})$, and the average waiting time due to transfer $E(\delta_{j,t})$.

The seek time issue relates to the fact that the seek time for a request depends directly on the scheduling methodology employed by the controller of the storage device in question. Many hard disk drive controllers in particular use a C-SCAN scheduling methodology, as known within the art. For simplicity, it is assumed that seek time is proportional to the number of tracks covered. Within the C-SCAN scheduling methodology, the disk head moves from the outermost track to the innermost track and serves requests in the order in which it encounters them.

A request, therefore, sees no delay due to other requests being served. Instead, the disk head moves in a fixed manner and serves requests as they come in its paths, without spending any time in serving the requests. This is a direct implication of the linearity assumption and the fact that no time is spent for serving a request. Mathematical analysis has shown that the average delay in seeking is half of the time required to seek the complete disk ($T_S$), or, $$E(\delta_{j,s}) = \frac{T_S}{2} \quad (7)$$

Therefore, the objective in solving the seek time issue is given by $$\min \frac{1}{\lambda_{tot}} \sum_{j=1}^{M} \lambda_j \frac{T_S}{2} = \min \frac{1}{\lambda_{tot}} \frac{T_S}{2} \sum_{j=1}^{M} \lambda_j = \frac{T_S}{2} \quad (8)$$

$\lambda_j$ is the access time for storage device $D_j$. Thus, solving the seek time problem is independent of allocating logical data stores to the storage devices. Therefore, any allocation of logical data stores to storage devices is optimal for the seek time issue, such that the rotational delay and average transfer issues can be optimized and any solution that is optimal for both the rotational delay issue and the transfer time issue is optimal for the overall placement of logical data stores on the storage devices.

The rotational delay issue relates to the notion that even though the rotational delay of a request may not depend on the location of the previously accessed request, the requests are not served in first come, first served (FCFS) fashion, but rather are reordered by a parameter other than arrival time. However, the rotational delay issue can nevertheless still be formulated using queuing theoretic results for FCFS. This is because that, first, it can be proven that any work-conserving permutation of $R_s$, which is an ordered request set where all requests $r_i \epsilon R_s$ have the same service time s, has a total waiting time equal to the waiting time of $R_s$. Second, for a randomly ordered request set R with general service times, it can be proven that any random permutation of R has the same expected total waiting time as the expected total waiting time of the ordered set R. Therefore, the rotational delay $E(\delta_{j,r})$ for a storage device $D_j$ is estimated on this basis.

It is noted that a notion called the disk (i.e., storage device) run length $L_i^d$ of a logical data store $G_i$ is defined, for a given schedule $\Psi_j$ of requests on a storage device, as the expected number of requests of the logical data store that are served in a consecutive fashion in $\Psi_j$ where access locations are proximate to one another. Disk run length is in some sense the run length of a logical data store as perceived by the controller for a storage device. Thus, even though a logical data store may be completely sequential in its stream, as far as the storage device is concerned, it can serve just a number of such consecutive requests together, and this number is denoted as the disk run length of the logical data store in question.

It is noted that since arrivals are Markovian, the FCFS order is a random permutation of the requests. Therefore, where the scheduling methodology is not FCFS and is uncorrelated with rotational delay $S_{k,r}$ of request $r_k$, the waiting time equals the waiting time in the FCFS order and the standards results for FCFS can nevertheless be employed, as described in the previous paragraph. As such, the rotational delay issue can be represented as follows:

$$\min \sum_{j=1}^{M} \lambda_j E(\delta_{j,r}) \quad (9)$$

$$\forall \text{ storage devices } D_j \lambda_j = \sum_{i=1}^{N} x_{i,j} \lambda_i \quad (10)$$

$$\forall \text{ logical data stores } G_i E(S_{i,r}) = \frac{S_{rot/2}}{L_i^d} \quad (11)$$

$$\forall \text{ storage devices } D_j E(S_{D_j,r}) = \sum_{i=1}^{N} \frac{x_{i,j} \lambda_i E(S_{i,r})}{\lambda_j} \quad (12)$$

$$\forall \text{ storage devices } D_j E(S_{D_j,r}^2) = \sum_{i=1}^{N} \frac{x_{i,j} \lambda_i E(S_{i,r}^2)}{\lambda_j} \quad (13)$$

$$E(\delta_{j,r}) = \frac{\lambda_j E(S_{j,r}^2)}{2(1 - \lambda_j E(S_{j,r}))} \quad (14)$$

Here, $S_{rot/2}$ is the time taken by the storage device to complete a half rotation. Mathematical analysis can show that under the assumption that all rotation times are equally likely and disk run length has low variance, $E(S_{i,r}^2) = c(E(S_{i,r}))^2$, where $c = 4/3$. Even if this is not the case, c is simply some other constant. Therefore, the optimization problem can be expressed as $$\min c \sum_{j=1}^{M} \lambda_j \frac{\lambda_j (E(S_{j,r}))^2}{2(1 - \lambda_j E(S_{j,r}))} \quad (15)$$

It is noted that the transfer time issue can be formulated in the same manner in which the rotational delay issue has been formulated, by replacing $E(S_{i,r})$ with $E(S_{i,t})$ and $E(S_{i,r}^2)$ by $E(S_{i,t}^2)$ in expression (15). The only difference is that there may be no relationship between $E(S_{i,t})$ and $E(S_{i,t}^2)$ since transfer times can be arbitrarily variable.

Now, the method 300 is applied to N logical data stores in relation to M storage devices. First, the average load over all the storage devices is determined (302). The average load can be determined as follows:

$$\rho = \frac{1}{M} \sum_{i=1}^{N} (A[i] \cdot \lambda) \mathbb{I}(A[i] \cdot E(S_r)) \quad (16)$$

In equation (16), $A[i] \cdot \lambda$ is the request arrival rate of logical data store i, and $A[i] \cdot E(S_r)$ is the service time for requests made to logical data store i.

The logical data stores are then sorted (304). In one embodiment, the logical data stores are sorted by run length. The run length of a logical data store corresponds to the expected number of requests of the logical data store that are served consecutively where access locations on the storage devices on which the logical data store are proximate to each another. More formally, the run length $L_i$ of a logical data store $G_i$ is defined as the expected number of consecutive requests of $G_i$ that immediately follow $r_k$ and access a location that is close (within the track boundary) to $loc_k$, where $r_k$ is a request of the store $G_i$ accessing a location $loc_k$. Thus, logical data stores with higher run length are in the order before logical data stores with lower run length.

Sorting the logical data stores by run length allows the rest of the method 300 to minimize request time by solving the seek time issue, which refers to the time to travel to the right track, as well as the rotational latency issue, which refers to the time to access the correct sector. Sorting the logical data stores by run length does not allow the rest of the method 300 to minimize request time by solving the transfer time (of the data to the storage device) issue. However, this is acceptable, because transfer times are an order of magnitude smaller than rotational times, for instance. Sorting the logical data stores by run length are especially appropriate for homogenous traffic, such as multimedia constant bit rate applications, where transfer time has low variance.

However, in a further embodiment, the logical data stores may instead be sorted by their expected second moments of service time, which corresponds to the second moment of the expected service time of each request of a logical data store, where the expected service time corresponds to the expected delay time after a request has been made until it has been serviced. Such sorting may be advantageous where it cannot be assumed that transfer times are small as compared to rotational latency and seek times. Thus, what is leveraged is the observation that for a given scheduling methodology, the service time of a request $r_k$, excluding the seek time component, can be represented by a single equation. This is because once the schedule is fixed, the variation in waiting time from FCFS is captured by the seek time problem, and the rotational delay and transfer time issues for a stream $G_k$ can be considered as a combined problem with service time $S_{k,rt}$:

$$S_{k,rt} = S_{k,r} + S_{k,t} \quad (17)$$

Therefore, the rotational delay issue and the transfer time issue can be combined into an issue that is referred to as the rotational transfer issue herein, as follows.

$$\min \sum_{j=1}^{M} \lambda_j E(\delta_{j,rt}) \quad (18)$$

$$\forall \text{ storage devices } D_j \lambda_j = \sum_{i=1}^{N} x_{i,j} \lambda_i \quad (19)$$

$$\forall \text{ logical data stores } G_i E(S_{i,r}) = \frac{S_{rot/2}}{L_i^d} \quad (20)$$

$$\forall \text{ logical data stores } G_i E(S_{i,rt}) = E(S_{i,r}) + E(S_{i,t}) \quad (21)$$

$$\forall \text{ storage devices } D_j E(S_{j,rt}) = \sum_{i=1}^{N} \frac{x_{i,j} \lambda_i E(S_{i,rt})}{\lambda_j} \quad (22)$$

$$\forall \text{ storage devices } D_j E(S_{j,rt}^2) = \sum_{i=1}^{N} \frac{x_{i,j} \lambda_i E(S_{i,rt}^2)}{\lambda_j} \quad (23)$$

$$E(\delta_{j,rt}) = \frac{\lambda_j E(S_{j,rt}^2)}{2(1 - \lambda_j E(S_{j,rt}))} \quad (24)$$

Therefore, rather than sorting the logical data stores by run length, in this embodiment the logical data stores are sorted by $E(S_{i,rt}^2)$.

Next, the method sets a logical data store counter i to a numerical value one (306), as well as a storage device counter j to a numerical value one (308). The method 300 then repeats parts 312, 314, and 322 until the storage device counter j exceeds the total number of storage devices M within the array. The load $\rho_j$ for storage device j is initially set to a numerical value of zero (312). While this load is less than the average load $\rho$ (314), parts 316, 318, and 320 are performed.

The logical data store i is allocated to, or placed on, storage device j (316). The load for the storage device j is then incremented as follows (318):

$$\rho_j = \rho_j + (A[i] \cdot \lambda) \square (A[i] \cdot E(S_r)) \quad (25)$$

In equation (25), $A[i] \cdot \lambda$ is the request arrival rate of logical data store i. $A[i] \cdot E(S_r)$ is the service time for the requests of logical data store i. Finally, the logical data store counter I is incremented by one.

Once the while condition is no longer satisfied in part 314, the method 300 increments the storage device counter j (322), and the method 300 is repeated in part 310 until all the storage devices within the array have been processed. The algorithm of method 300 returns a logical data store allocation over the storage devices such that on average the waiting time is minimized, while at the same time the storage devices have balanced loads.

The foregoing discussion has assumed that seek times are linear in the number of storage device tracks covered. In practice, however, after serving a request, disk heads can take some time to start moving. They then accelerate for some time before settling at a constant speed. During the constant speed phase, seek times are represented by a constant component and a linear component. The acceleration phase is represented by a constant component and a square root component. If the number of logical data stores on a storage device is small, the equations for constant speed phase can be used throughout. Otherwise, they are nevertheless a reasonable approximation. An advantage with the model described within this invention is that the non-linear model also leads to optimal results.

The methodology of the method 300 of FIG. 3 depends, however, on the specific storage devices employed. As a result, the logical data store assignment may potentially vary depending on the storage devices used. Estimating the run length of a stream (or store) $G_i$ has been shown, but no specific methodology has been provided to estimate the disk run length of a logical data store $G_i$ on a disk server $D_j$. However, it can be observed that this actual value is not needed. Rather, an order of the values is sufficient for the methodology of FIG. 3 to perform properly. That is, for all streams $G_i$, $G_j$, i, j∈{1, N}

$$DRL_i^k \geq DRL_j^k \Leftrightarrow DRL_i^l \geq DRL_j^l \quad (26)$$

Here, $DRL_x^y$ is the disk run length for stream, or logical data store, x in relation to storage device y. It can be shown that an ordering based on run length is the same as an ordering based on disk run length. Hence, the method of this invention advantageously sorts streams based on run length, which can be easily estimated.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A computer-implemented method for placing a plurality of logical data stores on storage devices such that a client's store request time for said plurality of logical data stores placed on any of said storage devices is minimized, said method comprising:

determining, by a computer, an average load over all said storage devices, M, in relation to said plurality of logical data stores, said determining of said average load comprising:
for each logical data store i of said plurality of logical data stores, determining a product of a request arrival rate of said each logical data store i multiplied by an expected service time for requests for said each logical data store i;
summing of products for each logical data store i of said plurality of logical data stores; and
dividing said summing of products by M, all of said storage devices, to yield said average load over all said storage devices;
ordering, by said computer, each of said plurality of logical data stores by increasing run length,
wherein a run length i, corresponding to said logical data store i, is defined as an expected number of consecutive requests of said logical data store i that immediately follow a request k of said logical data store i to access a second location on a storage device j that is close to a first location of said request k;
loading, by said computer, a logical data store counter with a count i corresponding to each of said plurality of ordered logical data stores, and initializing said count i to one;
loading, by said computer, a storage device counter j corresponding to each storage device j, and initializing said count j to one;
initializing, by said computer, a load for each storage device j equal to zero;
for each storage device j,
if said load is less than said average load,
then: placing, by said computer, logical data store i on said storage device j; and incrementing, by said computer, said load for said storage device j by a request arrival rate of said logical data store i multiplied by a rotation time for requests of said logical data store i, otherwise incrementing said storage device counter j, and further placing logical data stores on a next storage device until said storage device counter j exceeds M.

2. The method of claim 1, wherein the request arrival rate of a logical data store specifies a rate at which requests to the logical data store arrive at the logical data store.

3. The method of claim 1, wherein the expected service time for the requests of a logical data store corresponds to an expected time of delay between the request being submitted to the disk from the queue, to it being served by the disk to which the logical store is assigned.

4. The method of claim 1, wherein the expected service time of each request corresponds to an expected time of delay between the request being submitted to a disk from the queue, to it being served by the disk to which the logical store is assigned.

5. The method of claim 1, wherein the expected service time for the request of a logical data store corresponds to an expected time of delay between the requests of that store being submitted to the disk from the queue, to it being served by the disk to which the logical store is assigned.

6. The method of claim 1, wherein each logical data store corresponds to an aggregated plurality of streams of requests to the logical data store.

7. A data-processing system comprising:

storage devices on which a plurality of logical data stores are placed; and a processor configured to implement a method for placing a plurality of logical data stores on storage devices such that a client's store request time for said plurality of logical data stores placed on any of said storage devices is minimized, said method comprising:

determining, by a computer, an average load over all said storage devices, M, in relation to said plurality of logical data stores, said determining of said average load comprising:

for each logical data store i of said plurality of logical data stores, determining a product of a request arrival rate of said each logical data store i multiplied by an expected service time for requests for said each logical data store i;

summing of products for each logical data store i of said plurality of logical data stores; and dividing said summing of products by M, all of said storage devices, to yield said average load over all said storage devices;

ordering, by said computer, each of said plurality of logical data stores by increasing run length, wherein a run length i, corresponding to said logical data store i, is defined as an expected number of consecutive requests of said logical data store i that immediately follow a request k of said logical data store i to access a second location on a storage device j that is close to a first location of said request k;

loading, by said computer, a logical data store counter with a count i corresponding to each of said plurality of ordered logical data stores, and initializing said count i to one;

loading, by said computer, a storage device counter j corresponding to each storage device j, and initializing said count j to one;

initializing, by said computer, a load for each storage device j equal to zero;

for each storage device j, if said load is less than said average load, then: placing, by said computer, logical data store i on said storage device j; and incrementing, by said computer, said load for said storage device j by a request arrival rate of said logical data store i multiplied by a rotation time for requests of said logical data store i, otherwise incrementing said storage device counter j, and further placing logical data stores on a next storage device, until said storage device counter j exceeds M.

* * * * *